United States Patent
Agrawal et al.

(10) Patent No.: US 11,049,164 B2
(45) Date of Patent: Jun. 29, 2021

(54) COORDINATED EVENT BASED WARDROBE RECOMMENDATION

(71) Applicant: International Business Machines Corporation, Armonk, NY (US)

(72) Inventors: Priyanka Agrawal, Bangalore (IN); Pankaj S. Dayama, Bangalore (IN); Amrita Saha, Bangalore (IN); Srikanth Govindaraj Tamilselvam, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 283 days.

(21) Appl. No.: 15/832,351

(22) Filed: Dec. 5, 2017

(65) Prior Publication Data
US 2019/0172118 A1    Jun. 6, 2019

(51) Int. Cl.
| | | |
|---|---|---|
| *G06Q 30/06* | (2012.01) | |
| *G06Q 50/00* | (2012.01) | |
| *H04L 29/08* | (2006.01) | |
| *G06F 16/435* | (2019.01) | |

(52) U.S. Cl.
CPC ....... *G06Q 30/0631* (2013.01); *G06F 16/435* (2019.01); *G06Q 50/01* (2013.01); *H04L 67/306* (2013.01)

(58) Field of Classification Search
CPC .. G06Q 30/0631; G06Q 50/01; G06F 16/435; H04L 67/306
USPC .......................................................... 707/748
See application file for complete search history.

(56) References Cited

U.S. PATENT DOCUMENTS

| | | |
|---|---|---|
| 7,756,753 B1 | 7/2010 | McFarland |
| 7,756,755 B2 | 7/2010 | Ghosh et al. |
| 2002/0138170 A1* | 9/2002 | Onyshkevych ........ G06Q 30/06 700/130 |
| 2006/0122857 A1 | 6/2006 | DeCotiis et al. |

(Continued)

OTHER PUBLICATIONS

Palmer, Alison, "Friendrobes: How to have a killer wardrobe at a fraction of the cost", Mirror Online, Dec. 4, 2013, 8 pages, Mirror Online.

(Continued)

*Primary Examiner* — Ashish Thomas
*Assistant Examiner* — Abdullah A Daud
(74) *Attorney, Agent, or Firm* — Ference & Associates, LLC

(57) ABSTRACT

One embodiment provides a method, including: receiving a user wardrobe query related to at least one item in a user's wardrobe to be worn for an event, wherein the user wardrobe query corresponds to at least one of an outfit recommendation query and an outfit sharing query; accessing a database comprising user profiles, each of the user profiles comprising (i) a listing of the at least one item in a user's wardrobe, (ii) at least one attribute of a user, and (iii) feature information for each of the at least one items indicating a feature of the item; determining at least one score for each of the at least one items; and providing at least one recommendation responsive to the user wardrobe query, wherein the at least one recommendation comprises an item from the user's wardrobe or another user's wardrobe having a score above a predetermined threshold.

15 Claims, 2 Drawing Sheets

(56) References Cited

U.S. PATENT DOCUMENTS

| | | | |
|---|---|---|---|
| 2007/0198120 A1* | 8/2007 | Wannier | G06Q 30/06 700/138 |
| 2010/0114654 A1 | 5/2010 | Lukose et al. | |
| 2010/0191770 A1* | 7/2010 | Cho | G06Q 30/0217 707/783 |
| 2011/0153456 A1* | 6/2011 | Clay | G06Q 30/02 705/26.63 |
| 2011/0270774 A1 | 11/2011 | Varshavsky et al. | |
| 2013/0252591 A1* | 9/2013 | Sasaki | H04W 4/50 455/414.1 |
| 2013/0268468 A1 | 10/2013 | Vijayaraghavan et al. | |
| 2014/0344102 A1* | 11/2014 | Cooper | G06Q 30/0631 705/26.7 |
| 2015/0026084 A1* | 1/2015 | Guo | G06Q 50/01 705/319 |
| 2016/0055236 A1* | 2/2016 | Frank | G06Q 30/02 707/748 |
| 2016/0210602 A1 | 7/2016 | Siddique et al. | |
| 2017/0076011 A1* | 3/2017 | Gannon | G06F 16/5866 |
| 2018/0060434 A1* | 3/2018 | Fu | G06F 16/9536 |
| 2019/0034995 A1* | 1/2019 | Dong | G06Q 30/0631 |

OTHER PUBLICATIONS

Brownie, Barbara, "Would you share your wardrobe?", The Guardian, Feb. 21, 2014, 3 page, The Guardian.

* cited by examiner

COORDINATED EVENT BASED WARDROBE RECOMMENDATION

BACKGROUND

An important decision an individual must make when preparing for an event (e.g., a workplace event, a social event, a corporate meeting, etc.) is what to wear to that event. Additionally, another potential decision that an individual may need to make is what item(s) to lend, or share, with one or more other individuals attending the same event or attending a different event. The decision regarding which articles of clothing to wear to an event and/or the decision regarding which articles of clothing to share for an event, may make event preparation very stressful for certain individuals.

BRIEF SUMMARY

A method, comprising: utilizing at least one processor to execute computer code that performs the steps of: receiving, at an information handling device, a user wardrobe query related to at least one item in at least one of a user's wardrobe and another user's wardrobe to be worn for an event, wherein the user wardrobe query corresponds to at least one of an outfit recommendation query and an outfit sharing query; accessing a database comprising a plurality of user profiles, each of the plurality of user profiles comprising (i) a listing of the at least one item in the user's wardrobe, (ii) at least one attribute of the user, and (iii) feature information for each of the at least one items indicating a feature of the item; determining, based on at least one of the plurality of user profiles and the user wardrobe query, at least one score for each of the at least one items, wherein the at least one score indicates a suitability for each of the at least one items with respect to the user wardrobe query; and providing, responsive to identifying at least one item from at least one of the user's wardrobe and the another user's wardrobe having a score greater than a predetermined threshold, at least one recommendation responsive to the user wardrobe query, wherein the at least one recommendation comprises the at least one item with the score greater than the predetermined threshold.

Another aspect of the invention provides an apparatus, comprising: at least one processor; and a computer readable storage medium having computer readable program code embodied therewith and executable by the at least one processor, the computer readable program code comprising: computer readable program code configured to receive a user wardrobe query related to at least one item in at least one of a user's wardrobe and another user's wardrobe to be worn for an event, wherein the user wardrobe query corresponds to at least one of an outfit recommendation query and an outfit sharing query; computer readable program code configured to access a database comprising a plurality of user profiles, each of the plurality of user profiles comprising (i) a listing of the at least one item in the user's wardrobe, (ii) at least one attribute of the user, and (iii) feature information for each of the at least one items indicating a feature of the item; computer readable program code configured to determine, based on at least one of the plurality of user profiles and the user wardrobe query, at least one score for each of the at least one items, wherein the at least one score indicates a suitability for each of the at least one items with respect to the user wardrobe query; and computer readable program code configured to provide, responsive to identifying at least one item from at least one of the user's wardrobe and the another user's wardrobe having a score greater than a predetermined threshold, at least one recommendation responsive to the user wardrobe query, wherein the at least one recommendation comprises the at least one item with the score greater than the predetermined threshold.

An additional aspect of the invention provides a computer program product, comprising: a computer readable storage medium having computer readable program code embodied therewith and executable by the at least one processor, the computer readable program code comprising: computer readable program code configured to receive a user wardrobe query related to at least one item in at least one of a user's wardrobe and another user's wardrobe to be worn for an event, wherein the user wardrobe query corresponds to at least one of an outfit recommendation query and an outfit sharing query; computer readable program code configured to access a database comprising a plurality of user profiles, each of the plurality of user profiles comprising (i) a listing of the at least one item in the user's wardrobe, (ii) at least one attribute of the user, and (iii) feature information for each of the at least one items indicating a feature of the item; computer readable program code configured to determine, based on at least one of the plurality of user profiles and the user wardrobe query, at least one score for each of the at least one items, wherein the at least one score indicates a suitability for each of the at least one items with respect to the user wardrobe query; and computer readable program code configured to provide, responsive to identifying at least one item from at least one of the user's wardrobe and the another user's wardrobe having a score greater than a predetermined threshold, at least one recommendation responsive to the user wardrobe query, wherein the at least one recommendation comprises the at least one item with the score greater than the predetermined threshold.

A further aspect of the invention provides a method, comprising: utilizing at least one processor to execute computer code that performs the steps of: receiving, at an input device operatively coupled to an information handling device, user wardrobe query input from a user corresponding to at least one of a clothing item to share and a clothing item to wear to an event; identifying at least one characteristic corresponding to the at least one of the clothing item to share and the clothing item to wear and the event; determining, from the identified at least one characteristic, a given item in a user's wardrobe or another user's wardrobe that corresponds to the user wardrobe query; and providing, to the user, a recommendation comprising the given item.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
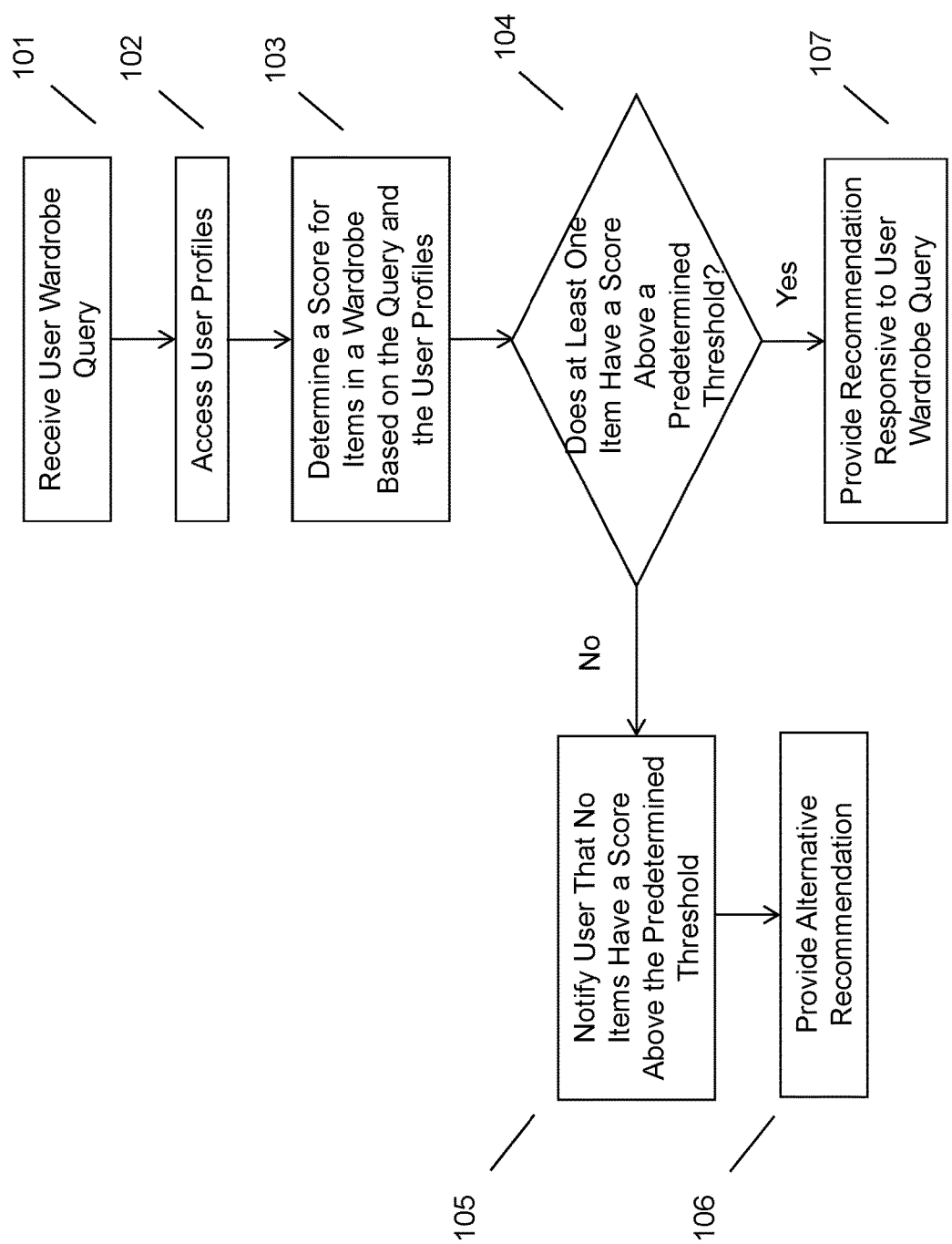
FIG. 1 illustrates an example method of providing a recommendation responsive to a user wardrobe query.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 2. In accordance with an example embodiment, all of the process steps, components and outputs discussed with respect to FIG. 1 can be performed or utilized by way of a processing unit or units and system memory such as those indicated, respectively, at 16' and 28' in FIG. 2, whether on a server computer, a client computer, a node computer in a distributed network, or any combination thereof.

An individual's outfit selection for an event (e.g., a workplace event, a social event, a corporate meeting, going to work, etc.) may be dependent on a variety of different factors associated with the event, for example, the formality of the event, status of those attending the event, the individual's familiarity of those attending the event, likely outfits of others attending the event, and the like. Another decision that an individual may need to make is what item(s) to lend, or share, with one or more other individuals attending the same event or attending a different event. For example, an individual may be comfortable with lending an item to another individual who has a different circle of friends or who is attending an event where none of the original item owner's friends are likely to be present. However, the same individual would not be comfortable with lending the same item to another individual if the other individual is attending the same event or any other event/workplace meeting where people in the individual's social network are likely to be. The sharing decision may be based on the aforementioned "what-to-wear" factors and also on other factors such as the cost value of the potential share item, the frequency that the individual wears the potential share item, the availability of other like-items in the individual's wardrobe, and the like.

The consideration of some or all of the aforementioned factors may result in a long decision-making process and/or place stress on the decision-maker. Additionally, due to the many factors that go into making these outfit decisions, some individuals may simply ignore these considerations and then later regret the outfit they chose to wear or share. For example, an individual may quickly choose an outfit to wear to an event and then later regret that outfit choice when they realize that another individual (e.g., a co-worker, etc.) has worn that same outfit. Furthermore, even the individuals who invest a great deal of thought into choosing an outfit to wear or share may still be left with a selection in which they have low-confidence because there is, conventionally, no way to provide feedback to the individual to the effect that their selection is justified. For example, an individual may want to wear a particular shirt to a social event but cannot be sure that another individual won't be wearing the same shirt.

Accordingly, the techniques and systems as described herein provide a smart, coordinated recommendation system and method for making recommendations on what to wear and/or what to share and with whom for an event. The system may receive a user wardrobe query related to an item in a user's wardrobe to be worn for an event. The wardrobe query may correspond to an outfit recommendation and/or an outfit sharing query. For example, the user may provide a request for a recommendation one what to wear for a particular event. A database may then be accessed that contains a plurality of user profiles associated with the user and other users that may or may not be attending the same event. Each of the user profiles may comprise a listing of the items in the user's wardrobe, an attribute of the user (e.g., a user's intent in purchasing an item, a user's personality, the frequency of a user's interactions with other users, a user's social network, etc.), and feature information for each of the items (e.g., how exclusive the item is, how expensive the item is, how comfortable the items is, how durable the item is, etc.). The system may then determine at least one score for each of the items in the user's wardrobe and provide at least one recommendation responsive to the user wardrobe query. Such a method may provide the user with one or more recommendations that will satisfy their outfit criteria and also allow users to have confidence in their outfit selections for an event.

Referring now to FIG. 1, the system may provide a recommendation responsive to a received user wardrobe query. At 101, the system may receive user wardrobe query input corresponding to an outfit recommendation query and/or an outfit sharing query for an event. The outfit recommendation query may correspond to a query to the system to provide a recommendation on an outfit to wear for the event. The outfit recommendation query may also be directed to a different user's wardrobe. For example, the system has access to other user's wardrobe profiles, as explained in more detail below. Accordingly, the system may provide a recommendation for an outfit to wear to the event that is (i) not in the user's own wardrobe, or (ii) for which different articles making up the outfit are located in different user's wardrobes. For example, the recommendation request could result in requiring the user to borrow wardrobe pieces from one or more other users.

The outfit sharing query may correspond to a query to the system to provide a recommendation for an outfit to share for the event. The recommendation for an outfit to share for the event may also result in a recommendation of an outfit that should definitely not be shared. Additionally, the recommendation for an outfit to share may also include a recommendation of an outfit or wardrobe item to be shared for a different event. For example, a user may be comfortable sharing an item as long as the individual borrowing the item is not attending the same event as the user. In the context of this application, an "outfit" may be composed of one or more items (e.g., one or more clothing items, one or more clothing accessories, etc.) and the user wardrobe query may be related to at least one item selected from a user's wardrobe and/or at least one item selected from another user's wardrobe.

In providing the query, the user may indicate for what event the user is requesting a recommendation. For example, the user may indicate that he or she is attending a particular social event and needs a recommendation on what to wear and what could be shared with another user from his or her wardrobe. Alternatively, the system may access a secondary information source to identify the event. For example, the system may access an Internet social media site, calendar entry, or the like, to determine that the user is attending a particular event. After determining the event the user is attending or preparing for, the system may determine the formality or other attributes associated with the event. Other attributes may include other attendees, location, outfits of other attendees, and the like. This information can be provided by the user or may be obtained from a secondary information source.

The user wardrobe query input may be user-provided input received at an input device (e.g., physical keyboard, on-screen keyboard, audio capture device, video capture device, etc.) operatively coupled to an information handling device (e.g., laptop computer, personal computer, tablet device, smart phone, smart speaker, etc.) and may be provided by any known method of providing input to an information handling device (e.g., touch input, text input, voice input, etc.). The information handling device may include digital assistant software disposed on the device that users may audibly interact with and which may perform user-commanded tasks as well as provide audible outputs responsive to corresponding user inputs. For example, a user may audibly provide, to a smart speaker, the user wardrobe queries "what should I wear to work tomorrow?" or "is it okay if I lend Bob my green jacket?"

At 102, the system may access a database comprising a plurality of user profiles. Each of the user profiles may comprise one or more of: i) a listing of the items in a user's wardrobe and/or another user's wardrobe; ii) an attribute associated with the user; and iii) feature information for each of the items indicating a feature of the item. The database may be an accessible storage database or location (e.g., local data storage location, remote storage location, cloud storage location, etc.).

Regarding the listing of items in a user's profile, the wardrobe item list may be manually provided by a user. For example, a user may manually enter and/or describe (e.g., in an input field, etc.) each item in their wardrobe. Additionally or alternatively, a user may scan (e.g., using a digital barcode scanner, etc.) or take a picture of (e.g., using a camera disposed on a smart phone, etc.) each clothing item and provide that information to the user profile (e.g., by uploading the photo to the user profile, by sending the scanned information to the user profile, etc.). A system may comprise a recognition engine capable of recognizing the type of item (e.g., pants, shirt, jacket, hat, etc.), brand of the item, material of the item (e.g., denim, suede, polyester, etc.), color of the item (e.g., salmon, yellow, blue, azure, lavender, etc.), length and/or size of the item, and other attributes of the item.

Additionally or alternatively, the item listing in a user's profile may be automatically updated responsive to identifying that the user has obtained new clothing items. For example, the system may have access to various contextual data sources associated with the user (e.g., emails, text messages, social media posts, credit card and/or other billing statements, etc.) and identify, from the monitoring of the contextual data sources, that a user has obtained a new item. For instance, the system may monitor a user's text messages and identify from the text message "I love my new blue Ralph Lauren® polo shirt I got for Christmas" that a user has just received a new Ralph Lauren® polo shirt and thereafter automatically update the user's wardrobe listing with this new information.

The attribute associated with the user may be related to a user's personality (e.g., shy, outgoing, fashion-forward, center-of-attention, wants to be unique, etc.), a user's relationship to a particular social network (e.g., a user is a co-worker in an office, a user is a friend in a group of friends, etc.), a user's relationship to identified attendees for an event, and the like. The attribute may also indicate whether the user is attending a particular event, for example, if the user is attending a particular social event and if they have decided on the outfit they are wearing for that event. The attribute may also be related to the comfort-level of the user, for example, if the user likes to be comfortable, if the user is willing to give up comfort for fashion, or the like. The attribute of the user may also correspond to how the user treats items, for example, is the user hard on items, is the user sloppy, is the user neat, does the user return items in a timely manner, and the like. This may provide input to the system on whether other items should be shared with the user.

The feature information may correspond to the user's intent in purchasing the item (e.g., to wear for formal occasions, to wear to the beach, to wear to impress another individual, etc.), the exclusivity of the item (e.g., a rarely found item in the public marketplace, a rarely found item among a particular social group, a common item, etc.), durability of the item (e.g., delicate vs. sturdy, etc.), the comfort of the item, the price of the item, and the like. This information may be used by the system to determine whether the item is a good candidate for wearing to a particular event or for sharing with other users. For example, if the item is very exclusive and can easily get damaged, the system may determine that it is not a good candidate for sharing, particularly with another user who is known to damage items. Information for both the attributes associated with the user as well as the feature information for the items, may be obtained manually (e.g., by manually provided user input, etc.) or may be obtained automatically (e.g., by accessing and monitoring various user contextual data sources such as emails, text message, social media, etc.).

At 103, an embodiment may determine at least one score for the items in the user's wardrobe and/or the items in the other users wardrobe based on the user profiles and the user wardrobe query. The score may be, for example, a numerical score from 1-100 that may provide an indication as to how suitable a particular item is with respect to the user wardrobe query. A higher numerical score may indicate that a particular item is more suitable for an event than an item that receives a lower score. For example, a system may identify (e.g., by analyzing accessible information present in the plurality of user profiles, etc.) that both the user and another user own the same, or substantially similar, dress and that the other user plans on wearing that dress to an event the user is also attending. The system may therefore assign that dress a lower score (e.g., 40, etc.) and assign another outfit that another user is not wearing a higher score (e.g., 90, etc.). In another example, another user attending the same event as the user may ask the user to borrow an article of clothing. As part of an outfit sharing query, a system may assign a lower score to an item that is very expensive or that is not easily substitutable.

The example of a numerical score may be used here throughout; however, it should be understood that the score may not necessarily be a number. For example, the score may be a rating (e.g., highly recommended, not recommended, not likely to be seen at the event, etc.), a range (e.g., 30%-50% chance that another user is not wearing this item, etc.), color coding (e.g., green which may indicate recommended, red which may indicate not recommended, etc.), and the like. The score may also be associated with a wardrobe of another user. For example, the system may access another user's profile and identify an item that the other user has indicated they are willing to share and determine a suitability score for that item. Alternatively, the other user may not have to identify the item as a shareable item. For example, the system may access the user profile of the other user and identify a wardrobe item that may be suitable for the event. If the user then selects this item, the system may send a request to the other user regarding whether the other user is willing to share the item. The user may also set up the system to only select items from the user's own wardrobe for recommendation, select items from other user's wardrobes in addition to the user's own wardrobe, only select items from other user's wardrobe, select items from only certain user's wardrobes, or the like.

A system may also simultaneously determine two scores for the clothing items: an outfit recommendation score associated with an outfit recommendation query and an outfit sharing score associated with an outfit sharing query. The generation of two scores may be done each time a user wardrobe query is received (i.e., even if the user wardrobe query only comprises just one of an outfit recommendation query or an outfit sharing query). Alternatively, the generation of two scores may only be done when the user wardrobe query comprises both an outfit recommendation query and an outfit sharing query. In such a situation, if an outfit sharing query also identifies another user with whom to share an item, the system may access that user's profile (if available) to help in outfit sharing score determination. Additionally, as part of the two-score system, the system may assign a lower outfit sharing score to an item that has a high outfit recommendation score, and vice versa. For example, responsive to determining that a particular item of clothing is very suitable for a user to wear for an event, a system may assign that item of clothing an outfit recommendation score of 90 and an outfit sharing score of 30.

A system may automatically update, or change, a score originally assigned to an item responsive to detecting at least one change associated with the event. The change may be a change in a user's attendance, a change in another user's outfit, a change in an event circumstance, and the like. The change may also be related to an update in information regarding another user's outfit. For example, a user may update a social media site with a picture of the outfit that the user is planning on wearing. The system may then identify this new outfit, where there was not one before, as a change to possibly update the original score.

The system may automatically update the score assigned to one or more items responsive to the change in the event. For example, a system may originally assign an article of clothing a high outfit recommendation score. At a later point, a system may identify that another user who has indicated they will attend the event plans on wearing the same, or substantially similar, outfit as the outfit having the high recommendation score. Accordingly, the system may, for example, automatically decrease the originally assigned high outfit recommendation score. In another example, the system may detect (e.g., from a social media update, etc.) that the event venue has now been changed from an indoor location to an outdoor location. This change may affect a score assigned to an article of clothing because, for example, while a dress may have originally been assigned a high outfit recommendation score when the event was indoors, the dress may now be assigned a lower score because the event has moved outdoors, which may make the dress a less suitable clothing option for the event (e.g., because it will be colder, etc.).

A system may provide, at 107, at least one recommendation to the user wardrobe query responsive to identifying, at 104, that an item in the user's wardrobe or an item in another user's wardrobe comprises a score that is greater than a predetermined threshold. For example, a predetermined threshold score for both, an outfit recommendation query and an outfit sharing query, may be 85. A system may recommend to a user an item to wear or share with a determined score above 85. If only one item in the user's wardrobe or another user's wardrobe has a score above 85, then that item is the default recommendation. However, if multiple items have a score above 85, then a system may recommend the highest scoring item (e.g., the system may recommend the item having a score of 95 over the item having a score of 90, etc.). Alternatively, the system may provide a recommendation including all of the outfits and let the user choose which outfit of the recommended outfits to wear. The predetermined threshold may be pre-programmed or may be adjusted by a user. The recommendation may be provided by/on an output device (e.g., a display screen, a speaker, etc.) and may be provided by any known method of providing output (e.g., textual output, image output, video output, audible output, etc.).

Responsive to identifying, at 104, that no items in the user's wardrobe or in another user's wardrobe have a score that is greater than a predetermined threshold, the system may, at 105, provide a notification to a user explaining the same. Additionally and/or alternatively, a system may still provide, at 106, a recommendation on an outfit to wear or an outfit to share even if no items have a score above the predetermined threshold, wherein the recommendation corresponds to the item of clothing having the highest score. For example, a predetermined threshold may be 85 but the highest scoring item may be 75. A system may provide the user with a notification that none of the items have a score above the predetermined threshold but the recommended outfit is the one having the highest recommendation score.

Additionally, the system may use similar criteria for providing recommendations on what items to share or with whom the items can or should be shared with. For example, the system may provide different sharing scores for the same item based upon the user with whom the item would be shared. This determination can be based upon the attributes of the users. For example, if the user sharing an item is very particular about how the item is treated, the system may generate a low sharing recommendation score for a user who treats items badly, but a high sharing recommendation score for a user who treats items very well. Additionally, the sharing score may be based upon where the borrowing user would wear the item. For example, the owner of the item may want to wear the item to work one day and want to be the first person to wear it to work. Based on this information, the system may determine that the item should not be shared with a co-worker or a person who has indicated they would wear it to work and would, therefore, provide a low sharing recommendation score. The sharing recommendation score may be generated in response to the user requesting the sharing recommendation score, or may be generated in response to another user requesting to share the item.

Figure 2:
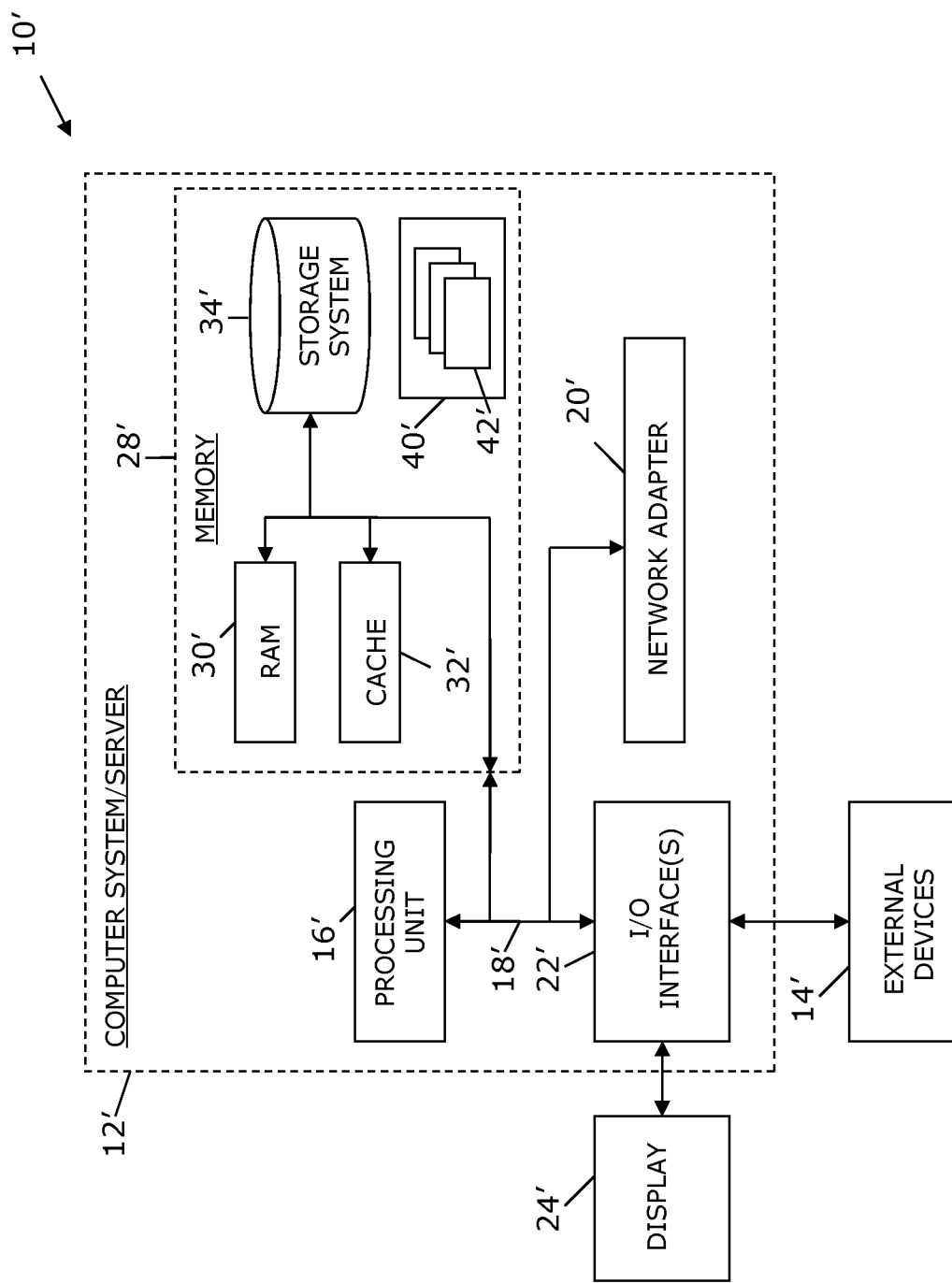
FIG. 2 illustrates a computer system.

As shown in FIG. 2, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
utilizing at least one processor to execute computer code that performs the steps of:
receiving, at an information handling device, a user wardrobe query related to at least one item in at least one of: a user's wardrobe and another user's wardrobe, to be worn for an event, wherein the user wardrobe query corresponds to at least one of an outfit recommendation query and an outfit sharing query;
identifying at least one aspect associated with the event, wherein the at least one aspect is selected from the group consisting of: a formality of the event, a guest list for the event, an outfit worn by at least one projected guest at the event, and a location of the event;
accessing a database comprising a plurality of user profiles, each of the plurality of user profiles comprising (i) a listing of the at least one item in the user's wardrobe, (ii) at least one attribute of the user, and (iii) feature information for each of the at least one items indicating a feature of the item;

determining at least two scores for each of the at least one items within the plurality of user profiles, wherein one of the at least two scores comprises an outfit recommendation score corresponding to the outfit recommendation query and indicating how suitable each of the at least one items is to wear to the event and is based upon: the identified at least one aspect, the at least one attribute of the user, and the feature information, wherein another of the at least two scores comprises an outfit sharing score corresponding to the outfit sharing query and indicating how suitable each of the at least one items is to share with another user, wherein the determining at least two scores for each of the at least one items comprises automatically updating the at least two scores upon detecting a change in the at least one aspect associated with the event; and providing, responsive to identifying at least one item from at least one of: the user's wardrobe and the another user's wardrobe having a score greater than a predetermined threshold, at least one recommendation responsive to the user wardrobe query, wherein the at least one recommendation comprises the at least one item with the score greater than the predetermined threshold.

2. The method of claim 1, wherein the at least one attribute of a user is selected from the group consisting of user intent, user interaction, user personality, and social network.

3. The method of claim 1, wherein the feature information is selected from the group consisting of exclusivity, pricing, comfort, and reusability.

4. The method of claim 1, wherein the determining comprises detecting at least one change in the event.

5. The method of claim 4, wherein the at least one change is selected from the group consisting of a change in a user's attendance, a change in another user's outfit, a change in event circumstance, and an update in information related to another user's outfit.

6. The method of claim 4, wherein the at least one change is detected from a social media update.

7. The method of claim of claim 1, wherein the providing the at least one recommendation comprises recommending the at least one item with the highest score.

8. The method of claim 1, wherein the at least one recommendation corresponds to at least one of a recommendation for an outfit to wear to the event and a recommendation for an outfit to share for the event.

9. An apparatus, comprising:

at least one processor; and a computer readable storage medium having computer readable program code embodied therewith and executable by the at least one processor, the computer readable program code comprising:

computer readable program code configured to receive a user wardrobe query related to at least one item in at least one of: a user's wardrobe or another user's wardrobe, to be worn for an event, wherein the user wardrobe query corresponds to at least one of an outfit recommendation query and an outfit sharing query;

computer readable program code configure to identify at least one aspect associated with the event, wherein the at least one aspect is selected from the group consisting of: a formality of the event, a guest list for the event, an outfit worn by at least one projected guest at the event, and a location of the event;

computer readable program code configured to access a database comprising a plurality of user profiles, each of the plurality of user profiles comprising (i) a listing of the at least one item in the user's wardrobe, (ii) at least one attribute of a user, and (iii) feature information for each of the at least one items indicating a feature of the item;

computer readable program code configured to determine at least two scores for each of the at least one items within the plurality of user profiles, wherein one of the at least two scores comprises an outfit recommendation score corresponding to the outfit recommendation query and indicating how suitable each of the at least one items is to wear to the event and is based upon: the identified at least one aspect, the at least one attribute of the user, and the feature information, wherein another of the at least two scores comprises an outfit sharing score corresponding to the outfit sharing query and indicating how suitable each of the at least one items is to share with another user, wherein the determining at least two scores for each of the at least one items comprises automatically updating the at least two scores upon detecting a change in the at least one aspect associated with the event; and computer readable program code configured to provide, responsive to identifying at least one item from at least one of: the user's wardrobe and the another user's wardrobe, with a score greater than a predetermined threshold, at least one recommendation responsive to the user wardrobe query, wherein the at least one recommendation comprises the at least one item with the score greater than the predetermined threshold.

10. A computer program product, comprising:

a computer readable storage medium having computer readable program code embodied therewith and executable by the at least one processor, the computer readable program code comprising:

computer readable program code configured to receive a user wardrobe query related to at least one item in at least one of: a user's wardrobe or another user's wardrobe, to be worn for an event, wherein the user wardrobe query corresponds to at least one of an outfit recommendation query and an outfit sharing query;

computer readable program code configure to identify at least one aspect associated with the event, wherein the at least one aspect is selected from the group consisting of: a formality of the event, a guest list for the event, an outfit worn by at least one projected guest at the event, and a location of the event;

computer readable program code configured to access a database comprising a plurality of user profiles, each of the plurality of user profiles comprising (i) a listing of the at least one item in the user's wardrobe, (ii) at least one attribute of a user, and (iii) feature information for each of the at least one items indicating a feature of the item;

computer readable program code configured to determine at least two scores for each of the at least one items within the plurality of user profiles, wherein one of the at least two scores comprises an outfit recommendation score corresponding to the outfit recommendation query and indicating how suitable each of the at least one items is to wear to the event and is based upon: the identified at least one aspect, the at least one attribute of the user, and the feature information, wherein another of the at least two scores comprises an outfit sharing score corresponding to the outfit sharing query and indicating how suitable each of the at least one items is to share with another user, wherein the determining at least two scores for each of the at least one items comprises automatically updating the at least two scores upon detecting a change in the at least one aspect associated with the event; and computer readable program code configured to provide, responsive to identifying at least one item from at least one of: the user's wardrobe and the another user's wardrobe, with a score greater than a predetermined threshold, at least one recommendation responsive to the user wardrobe query, wherein the at least one recommendation comprises the at least one item with the score greater than the predetermined threshold.

11. The computer program product of claim 10, wherein the at least one attribute of a user is selected from the group consisting of user intent, user interaction, user personality, and social network.

12. The computer program product of claim 10, wherein the feature information is selected from the group consisting of exclusivity, pricing, comfort, and reusability.

13. The computer program product of claim 10, wherein the determining comprises detecting at least one change in the event.

14. The computer program product of claim 13, wherein the at least one change is selected from the group consisting of a change in a user's attendance, a change in another user's outfit, a change in event circumstance, and a change in a social media status.

15. The computer program product of claim 10, wherein the at least one recommendation corresponds to at least one of a recommendation for an outfit to wear to the event and a recommendation for an outfit to share for the event.

* * * * *